(12) United States Patent
Weisman et al.

(10) Patent No.: US 9,935,997 B2
(45) Date of Patent: Apr. 3, 2018

(54) SYSTEM FOR TRANSFORMING MOBILE APP INTO ADDRESSABLE NETWORK FOR STATELESS ACCESS

(71) Applicant: Samsung Electronics Co., Ltd., Suwon-si, Gyeonggi-do (KR)

(72) Inventors: Omri Weisman, Tel Aviv (IL); Manikandan Sankaranarasimhan, Hayward, CA (US); Benny Zilberstein, Tel Aviv (IL); Yehuda Rajuan, Hertzelia (IL); Idan Elad, San Francisco, CA (US); Ran Nozik, Tel Aviv (IL); Kalyan Desineni, Mountain View, CA (US); Eli Cohen, Tel Aviv (IL)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/245,255

(22) Filed: Aug. 24, 2016

(65) Prior Publication Data

US 2017/0195395 A1 Jul. 6, 2017

Related U.S. Application Data

(63) Continuation of application No. 14/986,537, filed on Dec. 31, 2015.

(51) Int. Cl.
*H04L 29/08* (2006.01)
*H04M 1/725* (2006.01)
*H04L 29/12* (2006.01)

(52) U.S. Cl.
CPC ........... *H04L 67/02* (2013.01); *H04L 61/2007* (2013.01); *H04L 67/18* (2013.01); *H04L 67/22* (2013.01); *H04M 1/72561* (2013.01)

(58) Field of Classification Search
CPC ....... H04L 67/02; H04L 29/06; H04L 69/329; H04L 67/2823; H04L 67/34;
(Continued)

(56) References Cited

U.S. PATENT DOCUMENTS 7,472,413 B1 * 12/2008 Mowshowitz .......... G06F 21/31
726/10
8,494,510 B2 * 7/2013 Backholm ......... H04M 3/42178
455/414.1

(Continued)

*Primary Examiner* — Chirag R Patel
(74) *Attorney, Agent, or Firm* — Jefferson IP Law, LLP (57) ABSTRACT

A computer system includes a master controller that receives an HTTP request for a first URL. The URL indicates a first state of a first mobile application. A navigation controller navigates to the first state of the first mobile application within a device. A content scraper extracts content from the first state and identifies forward links to corresponding additional states of the first mobile application. The computer system includes an output formatter configured to package the content and the forward links into an HTTP response and transmit the HTTP response to a source of the first HTTP request. The HTTP response includes a forward URL for each additional state of the first mobile application reachable from the first state. For each additional state, the forward URL includes an indicator of the first mobile application and a path to reach the additional state within the first mobile application.

20 Claims, 8 Drawing Sheets

(58) Field of Classification Search
CPC ............... H04L 61/2007; H04L 67/22; G06F 17/30876; G06F 17/30905; H04M 1/72561
See application file for complete search history.

(56) References Cited

U.S. PATENT DOCUMENTS

| | | | |
|---|---|---|---|
| 9,292,367 B2* | 3/2016 | Mickens | G06F 9/4856 |
| 9,313,215 B2* | 4/2016 | Kalgi | H04L 63/1408 |
| 2005/0268301 A1* | 12/2005 | Kelley | G06F 9/4843 |
| | | | 718/100 |
| 2008/0008179 A1* | 1/2008 | Chen | H04L 61/2007 |
| | | | 370/392 |
| 2008/0155525 A1* | 6/2008 | Ho | G06F 17/30578 |
| | | | 717/168 |
| 2012/0155292 A1* | 6/2012 | Zazula | H04L 41/145 |
| | | | 370/252 |

* cited by examiner

SYSTEM FOR TRANSFORMING MOBILE APP INTO ADDRESSABLE NETWORK FOR STATELESS ACCESS

CROSS-REFERENCE TO RELATED APPLICATIONS

The present application is a continuation of U.S. patent application Ser. No. 14/986,537 filed on Dec. 31, 2015. The entire disclosure of the application referenced above is incorporated by reference.

FIELD

The present disclosure relates to crawling, and more particularly to crawling mobile applications.

BACKGROUND

Search engines are an integral part of today's electronic world. A search engine is generally powered by a collection of search indices. A search index may associate keywords or combinations of keywords to particular locations (such as web pages) containing or related to those keywords. In order to generate and maintain these search indices, search engines often use crawlers to find and identify documents and extract information from the documents. A web crawler requests a document (a web page) from the web server and indexes keywords in the document. Web page metadata and heuristics may allow the crawler to recognize the importance or semantic meaning of various aspects of the document.

As the world transitions to more and more content being available through mobile platforms and some content only being available through mobile platforms, search engines increasingly rely on content from applications and not just content from web pages. However, with the wide variety of applications (referred to interchangeably as apps), and the nearly infinite ways in which content can be assembled and presented in these apps, recognizing and interpreting data from apps is very difficult for a search engine. Further, because mobile applications are not readily addressable with URLs (Uniform Resource Locators), as on the World Wide Web, the significant advances made in web crawling technology cannot be directly applied to mobile applications.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer system includes a master controller configured to receive a first hypertext transfer protocol (HTTP) request for a first uniform resource locator (URL). The URL indicates a first state of a first mobile application. The computer system includes a device controller configured to provision a device to execute the first mobile application. The computer system includes a navigation controller configured to navigate to the first state of the first mobile application within the device. The computer system includes a content scraper configured to extract content from the first state and identify forward links to corresponding additional states of the first mobile application. Each forward link is expressed as a path to navigate from the first state to the corresponding additional state. The computer system includes an output formatter configured to package the content and the forward links into an HTTP response and transmit the HTTP response to a source of the first HTTP request. The HTTP response includes a forward URL for each additional state of the first mobile application reachable from the first state. For each additional state, the forward URL includes (i) an indicator of the first mobile application and (ii) a path to reach the additional state within the first mobile application.

In other features, the device comprises one of an emulator configured to execute an operating system on emulated hardware and a simulator configured to simulate interaction of the operating system with the first mobile application. The operating system is selected based on an operating system the first mobile application was compiled for. In other features, the computer system includes a web crawler configured to provide HTTP requests to the master controller based on forward URLs in prior HTTP responses. The computer system includes a content store configured to create a new record for each HTTP response transmitted by the output formatter. The record stores the content from the HTTP response. The computer system includes a deduplicator configured to, in response to a second HTTP response being transmitted by the output formatter, compare content from the second HTTP response to records in the content store. In response to identifying a record in the content store that matches the content from the second HTTP response, the deduplicator prevents the content store from creating a new record for the second HTTP response.

In other features, the content store is configured to, in response to the content from the second HTTP response matching the identified record in the content store, adding a second URL to the identified record in the content store. The second HTTP response was transmitted by the output formatter in response to the web crawler providing an HTTP request with the second URL to the master controller. In other features, the computer system includes a request rate manager configured to monitor an aggregate rate of accesses to the first mobile application and limit accesses to the first mobile application in response to a threshold being reached. The threshold is based on at least one of contractual and technical restrictions imposed by an operator of a backend server system that supplies data to the first mobile application.

In other features, the output formatter is configured to encode the content using extensible markup language (XML). In other features, the device controller is configured to provision the device to execute the first mobile application in response to the first HTTP request. In other features, the device controller is configured to provision additional devices to execute the first mobile application in response to receiving additional HTTP requests indicating the first mobile application.

In other features, for each additional state, the path of the forward URL includes a sequence of user interface (UI) events to perform to reach the additional state within the first mobile application. In other features, the computer system includes a proxy server configured to assign an externally-visible internet protocol (IP) address to the device. In other features, the proxy server is configured to select the IP address so that IP geolocation will presume the device is present at a specified location. The specified location is specified by an operator of a system transmitting the HTTP request.

A method of operating a computer system includes receiving a first hypertext transfer protocol (HTTP) request for a first uniform resource locator (URL). The URL indicates a first state of a first mobile application. The method includes provisioning a device to execute the first mobile application. The method includes navigating to the first state of the first mobile application within the device. The method includes extracting content from the first state and identifying forward links to corresponding additional states of the first mobile application. Each forward link is expressed as a path to navigate from the first state to the corresponding additional state. The method includes packaging the content and the forward links into an HTTP response and transmitting the HTTP response to a source of the first HTTP request. The HTTP response includes a forward URL for each additional state of the first mobile application reachable from the first state. For each additional state, the forward URL includes (i) an indicator of the first mobile application and (ii) a path to reach the additional state within the first mobile application.

In other features, the device includes one of an emulator configured to execute an operating system on emulated hardware and a simulator configured to simulate interaction of the operating system with the first mobile application. The operating system is selected based on an operating system the first mobile application was compiled for. In other features, the method includes providing HTTP requests based on forward URLs in prior HTTP responses. The method includes creating a new record in a content store for each transmitted HTTP response. The record stores the content from the HTTP response. The method includes, in response to a second HTTP response being transmitted, comparing content from the second HTTP response to records in the content store and, in response to identifying a record in the content store that matches the content from the second HTTP response, preventing the content store from creating a new record for the second HTTP response.

In other features, the method includes, in response to the content from the second HTTP response matching the identified record in the content store, adding a second URL to the identified record in the content store. The second HTTP response was transmitted in response to an HTTP request with the second URL. In other features, the method includes monitoring an aggregate rate of accesses to the first mobile application. The method includes limiting accesses to the first mobile application in response to a threshold being reached. The threshold is based on at least one of contractual and technical restrictions imposed by an operator of a backend server system that supplies data to the first mobile application.

In other features, the method includes encoding the content using extensible markup language (XML). In other features, the method includes provisioning the device to execute the first mobile application in response to the first HTTP request. The method includes provisioning additional devices to execute the first mobile application in response to receiving additional HTTP requests indicating the first mobile application. In other features, for each additional state, the path of the forward URL includes a sequence of user interface (UI) events to perform to reach the additional state within the first mobile application. In other features, the method includes assigning an externally-visible internet protocol (IP) address to the device so that IP geolocation will presume the device is present at a specified location. The specified location is specified by an operator of a system transmitting the HTTP request.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

In its simplest form, a web crawler begins with a seed list of addresses. The web crawler requests the web page located at each of those addresses and analyzes the returned web page for content and additional links. The web crawler then follows those additional links and reviews the content located at those addresses. Mobile applications, with no uniform addressing system, cannot be crawled using standard web crawling techniques.

However, if each state (or, screen) of a mobile app and the transitions from the present state to other states can be represented as addresses, the mobile app could be made accessible to a web crawler. When using a mobile application, the user can navigate from a home state (the state displayed when the app is first opened) to any other state using a sequence of user interface (UI) interactions, such as touches, swipes, and other gestures.

A state may be identified by the series of UI interactions that lead to the state. Some states can be reached directly, without UI interactions, by making an API (Application Programming Interface) call, which may be referred to as an intent for applications running in the ANDROID operating system. States that can be directly reached using an API call may be identified using the parameters of that API call. States that can be reached with further UI interactions after an API call may be identified by a combination of the API call and the series of UI interactions. For example only, the API call and series of UI interactions may be serialized into a string with forward slashes separating the API call from the UI interactions.

Because there may be multiple paths to reach a state using UI interactions, and yet more paths when beginning with an API call, each state may be identified by more than one address. For more information about identifying mobile app states based on access paths, see commonly-assigned U.S. patent application Ser. No. 14/849,540 filed Sep. 9, 2015, titled "Unguided Application Crawling Architecture," with first-named inventor Kalyan Desineni, the entire disclosure of which is incorporated by reference.

The identifier of a state may be formatted as a URL (Uniform Resource Locator). In a system according to the principles of the present disclosure, the URL indicates how to reach the corresponding state of the app. An emulator can execute the app and navigate to a given state based on a specified URL.

For example, the emulator may be a hardware emulator, providing virtual hardware resources on which an operating system (which may be a standard mobile operating system or a version of the mobile operation system modified to run on an emulator) is executed. The emulator may also be a simulator, which does not attempt to replicate the hardware resources of a device but instead provides common libraries and interface methods on which apps would commonly rely for a given operating system. In other implementations, the emulator may be replaced with a physical device. The physical device may be loaded with a special operating system built to give similar access to user interface event injection and screen captures.

For more information about emulation, see commonly-assigned U.S. patent application Ser. No. 14/981,244 filed Dec. 28, 2015, titled "Cloud-Enabled Architecture for On-Demand Native Application Crawling," with first-named inventor Kalyan Desineni, the entire disclosure of which is incorporated by reference.

A web crawler can request a URL corresponding to an app, and a computerized wrapper system can transform the URL into an access mechanism for a state of the app executing within the emulator. Once that state is reached in the emulator, the content, metadata, and outbound links from that state can be returned to the web crawler as a standard web page response. The links to other states from the designated state can be represented as URLs, allowing the web crawler to comprehend the mobile app as a standard page-addressable website.

Figure 1:
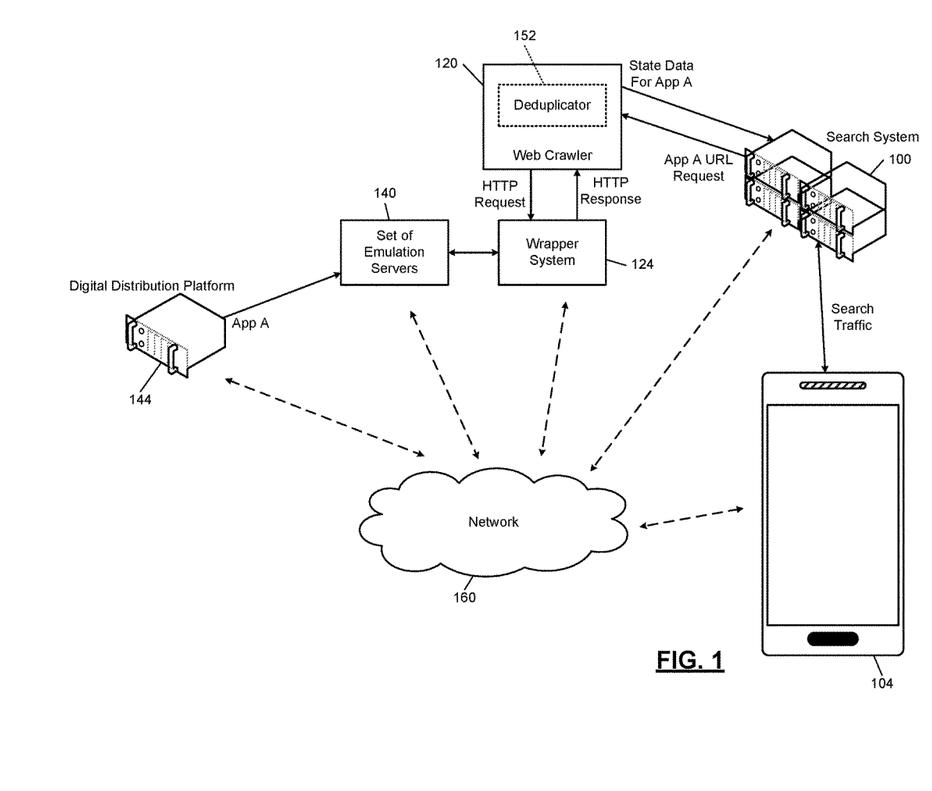
FIG. 1 is a functional block diagram of an example search architecture for mobile applications based on web crawler results.

In FIG. 1, an example system according to the principles of the present disclosure includes a search system 100 that receives search queries from a user device 104 and provides search results. The search results may include deep states—that is, results related to specific states of mobile apps.

An operator, or a heuristic process, of the search system 100 may determine that deep state information from a certain app (referred to as app A) should be obtained. For example, app A may be a popular app or an app with a high download velocity. App A may also be an app that an operator of the search system 100 has a specific interest in, or app A may provide data not available from apps already encompassed by the search system 100.

Regardless of how app A becomes of interest, the search system 100 may make a request to a web crawler 120 to obtain data for app A. The search system 100 may provide a URL to the web crawler 120 that may look like a standard web URL, but actually refers to app A. This request is based on the desire to incorporate data from App A, not from a specific query. The web crawler 120 then begins to crawl based on that initial URL. Once crawling is complete, the search system 100 will have data from App A with which to respond to queries.

The web crawler 120 makes HTTP (hypertext transport protocol) requests, which are intercepted by a wrapper system 124. The wrapper system 124 identifies which app is being requested and which state of that app to navigate to. The wrapper system 124 instructs a set of one or more emulation servers 140 to open app A in an emulator and navigate to the specified state. The URL request from the search system 100 to the web crawler 120 may specify a home state of app A. The emulation servers 140 may obtain app A from a digital distribution platform 144. Example digital distribution platforms include the PLAY STORE by Google Inc. and the APP STORE by Apple Inc. The emulation servers 140 scrape the content of the specified state and provide the content to the wrapper system 124.

The wrapper system 124 collects the data from the state and encodes forward links from that state to other states of app A. The data and links are packaged into an HTTP response. The HTTP response is returned to the web crawler 120. As described in more detail below, the web crawler 120 then follows the forward links, making HTTP requests to some or all of the forward links to further explore app A.

Because different URLs may resolve to the same state of App A, a deduplicator 152 may be implemented that attempts to recognize when HTTP responses appear to match from one URL to another. These matching responses indicate that the two URLs actually point to the same state. The web crawler 120 may therefore mark one of the duplicative URLs as not being necessary to crawl. For more information about deduplication, refer to commonly-assigned application Ser. No. 14/869,810, filed Sep. 29, 2015, titled "State Deduplication for Automated and Semi-Automated Crawling Architecture," with first-named inventor Kalyan Desineni, the entire disclosure of which is incorporated by reference.

While the data flow in FIG. 1 is shown with solid lines, the systems in FIG. 1 may actually communicate with each other via network 160, as shown with dashed lines. The network 160 may include wired and wireless local area networks, personal area networks, and wide area networks such as the Internet.

Figure 2A:
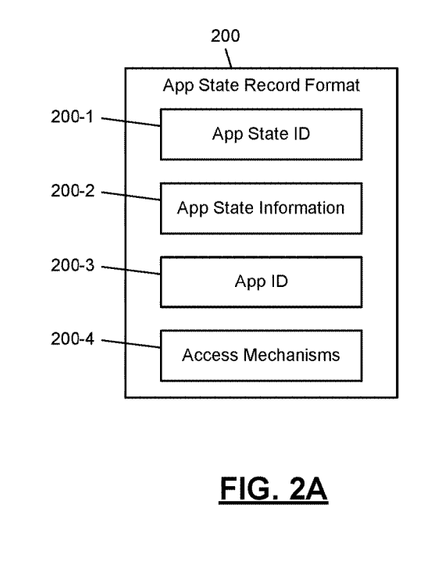
FIG. 2A is an example format for an app state record.

In FIG. 2A, an example of an app state record format 200 includes an app state identifier (ID) 200-1, app state information 200-2, an app identifier (ID) 200-3, and one or more access mechanisms 200-4. The app state ID 200-1 may be used to uniquely identify the app state record 200 in a search data store. The app state ID 200-1 may be a string of alphabetic, numeric, and/or special (e.g., punctuation marks) characters that uniquely identifies the associated app state record 200. In some examples, the app state ID 200-1 describes the application state in a human-readable form. For example, the app state ID 200-1 may include the name of the application referenced in the access mechanisms 200-4.

In a specific example, an app state ID 200-1 for an Internet music player application may include the name of the Internet music player application along with the song name that will be played when the Internet music player application is set into the specified state. In some examples, the app state ID 200-1 is a string (or triplet as discussed below) formatted similarly to a uniform resource locator (URL), which may include an identifier for the application and an identifier of the state within the application. In other implementations, a URL used as the app state ID 200-1 may include an identifier for the application, an identifier of an action to be provided by the application, and an identifier of an entity that is the target of the action.

Figure 2B:
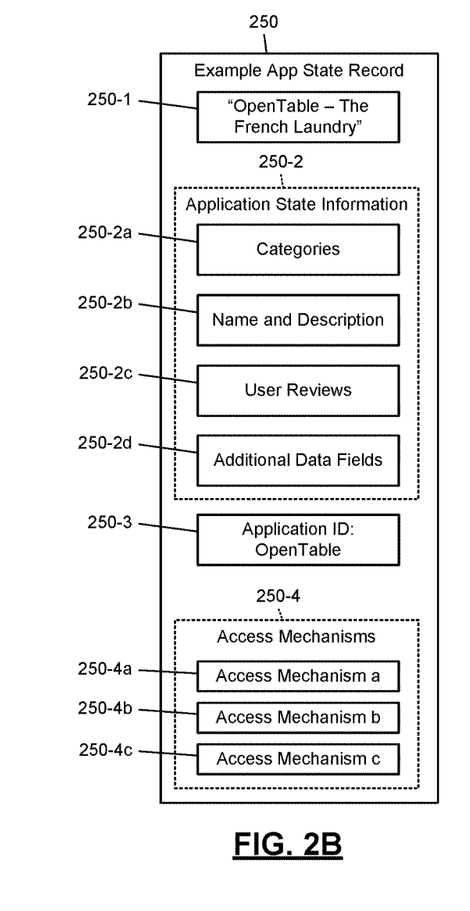
FIG. 2B is an example app state record according to the format of FIG. 2A.

For example only, see FIG. 2B, which shows an example app state record 250 associated with the OPENTABLE application from OpenTable, Inc. The OPENTABLE application is a restaurant-reservation application that allows users to search for restaurants, read reviews, and make restaurant reservations. The example app state record 250 of FIG. 2B describes an application state of the OPENTABLE application in which the OPENTABLE application accesses information for THE FRENCH LAUNDRY restaurant, a Yountville, Calif. restaurant. An app state ID 250-1 for the example app state record 250 is shown as "OpenTable—The French Laundry."

Another implementation of the displayed app state ID 250-1 is based on a triplet of information: {application, action, entity}. The triplet for the example app state record 250 may be {"OpenTable", "Show Reviews", "The French Laundry"}. As mentioned above, this triplet may be formatted as a URL, such as the following: "func://www.OpenTable.com/Show_Reviews/The_French_Laundry". Note that a different namespace is used ("func://") to differentiate from the standard web namespace ("http://"), as the URL-formatted ID may not resolve to an actual web page. For example, the OpenTable website may use a numeric identifier for each restaurant in their web URLs instead of the human-readable "The_French_Laundry."

Continuing with FIG. 2A, the app state information 200-2 may include data that describes an app state into which an application is set according to the access mechanisms 200-4. The data types included in the app state information 200-2 may depend on the type of information associated with the app state and the functionality specified by the access mechanisms 200-4. The app state information 200-2 may include a variety of different types of data, such as structured, semi-structured, and/or unstructured data. The app state information 200-2 may be automatically and/or manually generated and updated based on documents retrieved from various data sources, which may include crawling of the apps themselves.

In some examples, the app state information 200-2 includes data presented to a user by an application when in the app state corresponding to the app state record 200. For example, if the app state record 200 is associated with a shopping application, the app state information 200-2 may include data that describes products (such as names and prices) that are shown in the app state corresponding to the app state record 200. As another example, if the app state record 200 is associated with a music player application, the app state information 200-2 may include data that describes a song (such as by track name and artist) that is played or displayed when the music player application is set to the specified app state.

When the app state record 200 corresponds to a default state of an application, the app state information 200-2 may include information generally relevant to the application and not to any particular app state. For example, the app state information 200-2 may include the name of the developer of the application, the publisher of the application, a category (e.g., genre) of the application, a text description of the application (which may be specified by the application's developer), and the price of the application. The app state information 200-2 may also include security or privacy data about the application, battery usage of the application, and bandwidth usage of the application. The app state information 200-2 may also include application statistics, such as number of downloads, download rate (for example, average downloads per month), download velocity (for example, number of downloads within the past month as a percentage of total downloads), number of ratings, and number of reviews.

In FIG. 2B, the example app state record 250 includes app state information 250-2 for THE FRENCH LAUNDRY restaurant, including a restaurant category field 250-2a, a name and text description field 250-2b, user reviews field 250-2c, and additional data fields 250-2d.

The field 250-2a may include multiple categories under which the restaurant is categorized, such as the text labels "French cuisine" and "contemporary." The field 250-2b may include the name of the restaurant ("The French Laundry") and text that describes the restaurant. The field 250-2c may include text of user reviews for the restaurant. The field 250-2d may include additional data for the restaurant that does not specifically fit within the other defined fields, such as a menu, prices, and operating hours.

Continuing with FIG. 2A, the app ID 200-3 uniquely identifies an application associated with the app state record 200. For example, a value for application ID 250-3 in the app state record 250 uniquely identifies the OpenTable application. The application ID 250-3 may refer to a canonical OpenTable software product that encompasses all of the editions of the OpenTable application, including all the native versions of the OpenTable application across platforms (for example, IOS and ANDROID operating systems) and any web editions of the OpenTable application.

The access mechanisms 200-4 specify one or more ways that the state specified by the app state record 200 can be accessed. For any given user device, only some of the access mechanisms 200-4 may be relevant. For illustration, the example app state record 250 depicts three access mechanisms 250-4, including access mechanism "a" 250-4a, access mechanism "b" 250-4b, and access mechanism "c" 250-4c.

For example, the access mechanism 200-4a may include a reference to a native IOS operating system edition of the OPENTABLE application along with one or more operations to be performed by the user device. For example, the access mechanism 200-4a may include an application resource identifier for the native iOS edition of the OPENTABLE application and one or more operations that navigate to the state in the OPENTABLE application for THE FRENCH LAUNDRY restaurant.

The access mechanism 200-4b may include a reference to a native ANDROID operating system edition of the OPENTABLE application along with one or more operations to be performed by the user device to navigate to the state in the ANDROID OPENTABLE application for THE FRENCH LAUNDRY restaurant. The access mechanism 200-4c may include a reference to a web edition of the OPENTABLE application, such as a URL that corresponds to a web page for THE FRENCH LAUNDRY restaurant on the OPENTABLE web site.

Figures 3, 4:
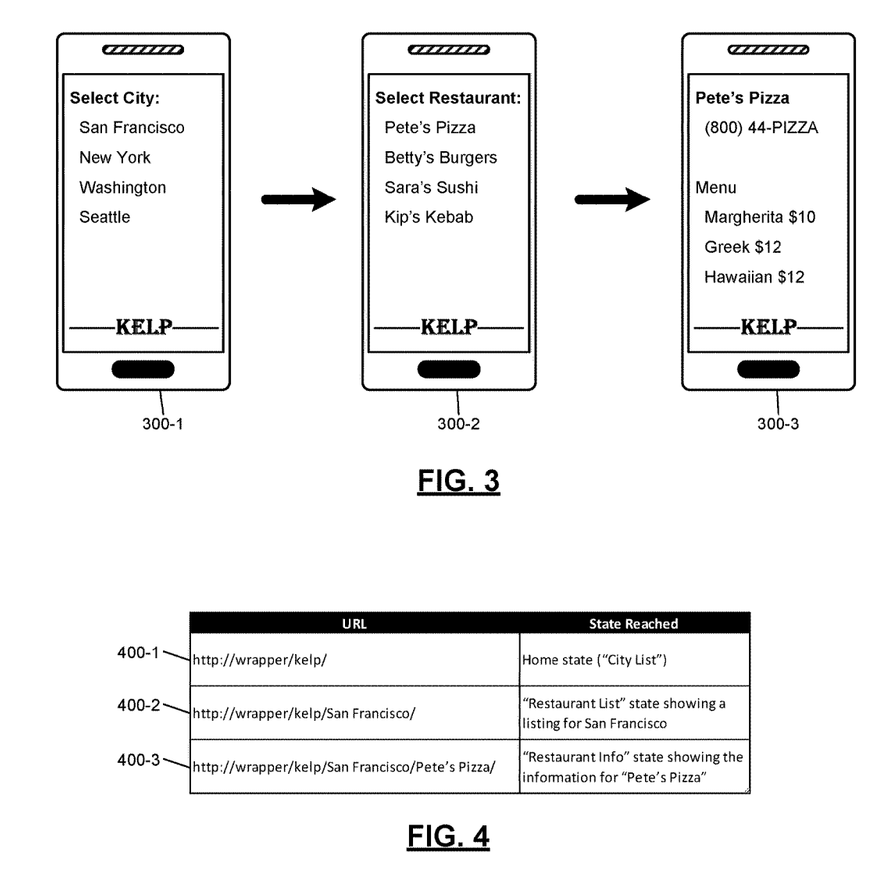
FIG. 3 is a graphical user interface of a fictitious app.
FIG. 4 is a table indicating how a state can be represented as a uniform resource locator (URL).

In FIG. 3, an example navigation for a simplified user interface of a fictitious restaurant information app called "KELP" is shown. At 300-1, a home state of the KELP app is shown, which lists cities for which restaurant information is available. By selecting one of the cities, such as San Francisco, a restaurant list state 300-2 is reached. By selecting one of the restaurants, Pete's Pizza, a restaurant information state 300-3 is reached.

In FIG. 4, a URL using an example naming scheme is shown for each of the states of FIG. 3. The http:// scheme may be preserved for the benefit of the web crawler 120, while the domain "wrapper" or, in other implementations, "wrapper.com," indicates that the wrapper system 124 should service the query. The next parameter in the URL indicates the app—in this case, KELP.

A first row 400-1 corresponds to the home state 300-1. A second row 400-2 corresponds to the restaurant listing state 300-2. While the URL includes "San Francisco," this parameter may be any identifier of the UI element that corresponds to San Francisco in the home state 300-1. For example, the UI element for San Francisco may have a unique identifier (such as an XPath ID). The internal ID may be used in the URL of the second row 400-2 instead of the text of the UI element.

A third row 400-3 of the table corresponds to the restaurant information state for Pete's Pizza 300-3. Again, the URL includes the text (Pete's Pizza) that caused the state 300-3 to be reached. However, the UI element may be identified using metadata that is not textual. For apps that do not change frequently, the location may be used instead of a more unique identifier. For example, the URL of the second row 400-2 of the table could use an index number of 0 instead of the text San Francisco. Similarly, an index of 1 could be used to indicate the state reached when selecting "New York" in the home state 300-1. As one more example, the URL for the state reached from selecting "Washington" in the home state 300-1 may be http://wrapper/kelp/2/.

Figure 5:
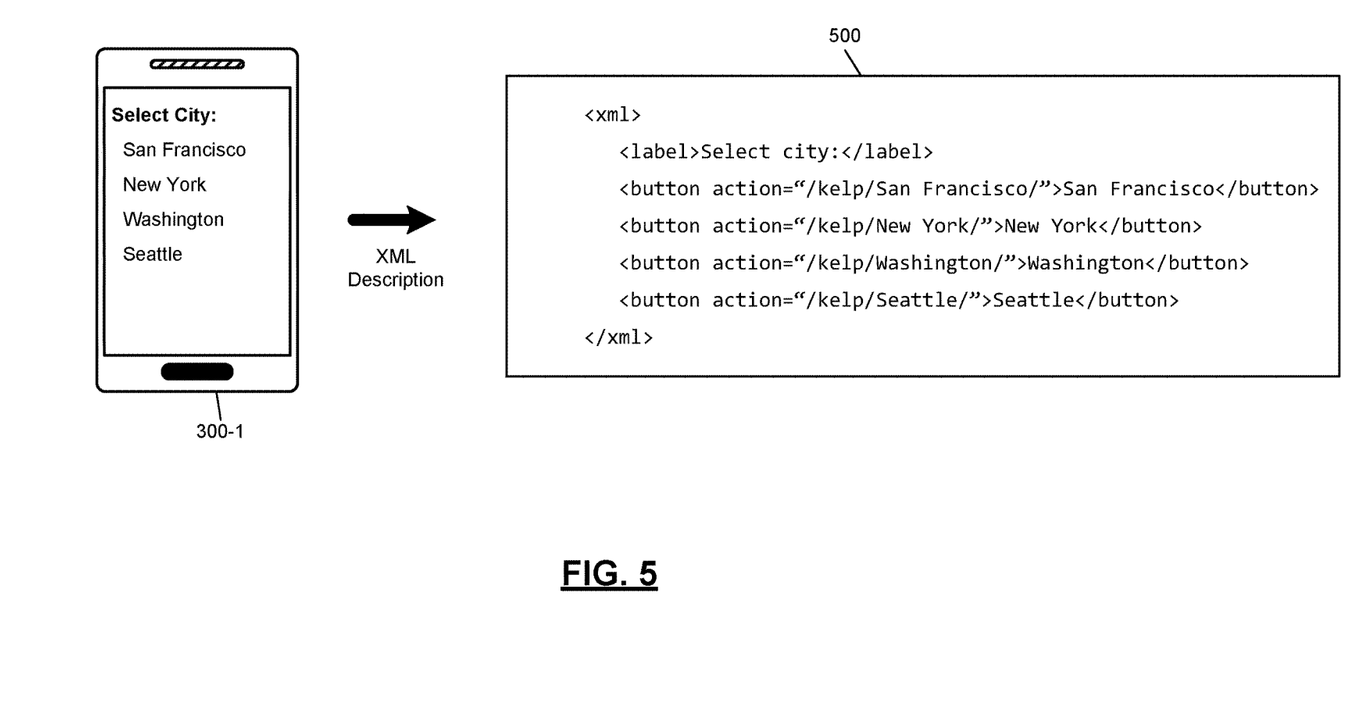
FIG. 5 is a graphical example of a markup language description of an app state.

In FIG. 5, the simplistic interface of the home state 300-1 may be represented in XML (Extensible Markup Language) at 500. The text of the label is encoded, and the text of each of the four buttons is encoded. In addition, the action occurring when each button is pressed is expressed as a relative URL. In various other implementations, formatting and placement information may also be encoded. For example, the fact that "select city:" is bolded may be recorded.

The order of the XML file may indicate an order of UI elements from top to bottom, although a more complex layout might require additional information about location of content. This additional metadata may be useful to the web crawler for inferring which portions of a document are headings, which portions have summary information, etc.

Figure 6:
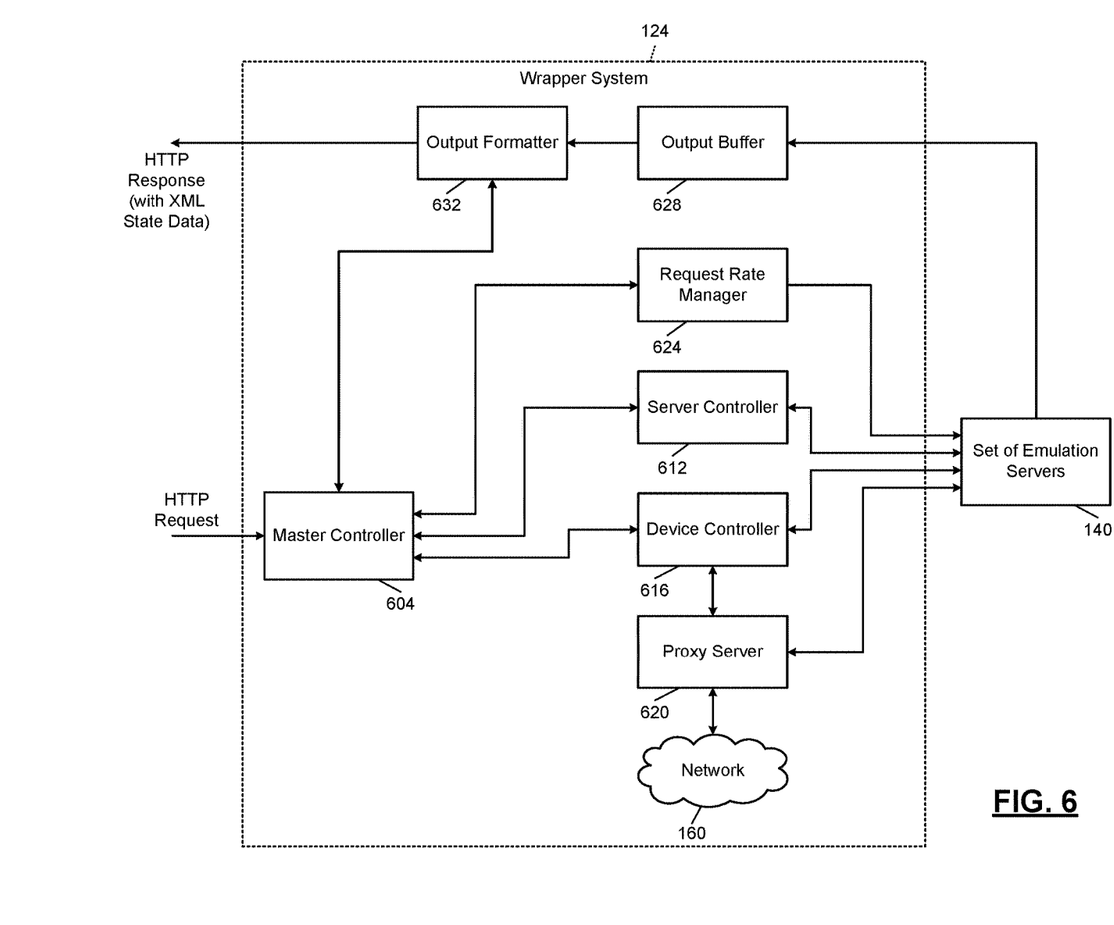
FIG. 6 is a functional block diagram of an example implementation of a wrapper system.

In FIG. 6, an example implementation of the wrapper system 124 includes a master controller 604 that receives an HTTP request from the web crawler 120 of FIG. 1. The master controller 604 controls the set of emulation servers 140 via a server controller 612. As described in FIG. 7, each server of the set of emulation servers 140 may include multiple emulator instances.

Each emulator instance includes an operating system (such as the ANDROID operating system or the APPLE IOS operating system). In some implementations, some operating systems may not have suitable emulators, in which case physical devices may run the operating systems and serve as emulators. For example only, a bank of physical smartphones may all be electrically connected (such as via USB) to an interface card that is controlled by the wrapper system 124.

Physical devices may be provided via a cloud platform so that the physical devices can be provisioned as needed. The cloud provider will have a physical limit to the availability of devices according to the number of physical devices that the cloud provider physically possesses. The physical devices may be loaded with a modified copy of a standard operating system, which may have been modified with additional accessibility, control, or user interface scripting features.

In some implementations, simulators may be used. A simulator may be considered a species in the emulator genus. Therefore, when the term emulator is used in this disclosure, both full hardware emulators as well as software simulators are encompassed by the term. Similarly, the term "device" may be a superset of emulator, and include both physical hardware devices as well as emulators.

While a full hardware emulator emulates device hardware and allows an exact or lightly-modified copy of an operating system to execute on the emulated hardware, a simulator offers a subset of the features of the full hardware emulator. For example, the simulator may simulate responses to API (Application Programming Interface) calls that a typical app would expect to invoke while executing.

In a simulation, the full native operating system running on real or emulated hardware is replaced by a set of libraries that, for most apps, are ideally indistinguishable, as far as an app is aware, from executing on an actual device running that operating system. Limitations of simulators may include a lack of sensor inputs (such as accelerometers), an inability to place or receive telephone calls, and the absence of accurate GPS (Global Positioning System) data.

Because simulators do not attempt to emulate specific hardware, they often require fewer processing and memory resources from the host operating system. This allows many more simulators to be run on a server than emulators. For example only, compared to hardware emulators, ten times more simulators may be simultaneously hosted. As described in more detail below, each simulator may be used for a different app, although multiple simulators may host copies of the same app for apps that are more popular, more rapidly changing, or that require more time to acquire results.

For example, apps written for the iOS operating system from Apple, Inc. may be loaded into simulators executing on the OS X operating system from Apple, Inc. One instance of the OS X operating system may be configured to host multiple simulators. In one example, eight simulators are hosted. In fact, a server (such as a server running a variant of the LINUX operating system) may include multiple virtual machines, each operating a virtualized instance of the OS X operating system, with each OS X operating system hosting multiple simulators.

Similar to iOS platform simulation on OS X, some ANDROID operating system apps may be executed using a runtime, such as Android Runtime for Chrome (ARC; alternatively, App Runtime for Chrome). An app may be referred to as an APK, the filename extension for a packaged version of an app. The APK may be repackaged or recompiled to work in a simulated environment. In some cases, this may be done programmatically without manual intervention of a software program.

The ARC may be integrated with the CHROME operating system and allows an app to run in a sandbox (a restricted memory area segregated from the rest of the operating system). In other implementations, the ARC may be implemented as an extension to the CHROME browser. For example, an implementation of the ARC framework named ARChon may allow an Android app to execute within a sandbox in a Chrome browser on operating systems other than Chrome OS, such as the Windows operating system, the Linux operating system, and the OS X operating system.

The server controller 612 initializes each server of the set of emulation servers 140, starts and stops (including, in various implementations, powering up and powering down) each server of the set of emulation servers 140, and manages the health of each of the set of emulation servers 140. Servers may be started and stopped depending on load level on the wrapper system 124.

In a virtualized hosting environment, the server controller 612 may start additional server instances, growing the size of the set of emulation servers 140, according to either current or expected demand. The server controller 612 may recognize patterns over time, such as whether days of the work week have a higher demand than days of the weekend. In addition, the server controller 612 may recognize the pattern that a higher demand is present in the evenings compared to the morning or afternoon.

The server controller 612 may monitor a load on the wrapper system 124, which may be measured as a percentage of total capacity, and may start or add servers to the set of emulation servers 140 when the utilization rises above a first threshold. In some implementations, a second, lower threshold may be used by the server controller 612 to determine when to power down, idle, or stop servers in the set of emulation servers 140. This hysteresis prevents brief lulls in activity from causing servers to be stopped that then quickly need to be restarted.

Hysteresis may also be created by waiting for a predetermined amount of time with utilization below the second threshold before stopping servers. To prevent instantaneous spikes in activity from causing more servers to be started, a time delay may be applied to the first threshold as well. In other implementations, a moving average may smooth brief peaks and troughs in utilization.

A device controller 616 interfaces with the emulators (or physical devices) on each of the set of emulation servers 140. The device controller 616 initializes the device with an operating system and optionally one or more default apps. Although the present disclosure will be described in terms of emulators, the principles of the present disclosure also apply to instances where physical devices are used instead of or in addition to emulators.

The device controller 616 maintains an open session between each of the emulators in the set of emulation servers 140 and the master controller 604. The device controller 616 also establishes which apps will be installed on which emulators and which app is in the foreground. In addition, the device controller 616 may determine which apps are running on each emulator.

In various implementations, before a crawl of an app is begun by the web crawler 120, an operator of the web crawler 120 may request that the device controller 616 provision devices with the app installed. The operator may specify how many devices to provision and may indicate a start time of the crawl by which time the devices should be provisioned.

The master controller 604 may instruct the server controller 612 regarding how many servers to start up as part of the set of emulation servers 140. The master controller 604 may instruct the device controller 616 which apps to install and execute on each emulator in the set of emulation servers 140.

When simulators are used, the device controller 616 may only be able to assign a single app to the simulator. In various implementations, the server controller 612 may start some servers that host hardware emulations and some servers that host simulations. In implementations where the operating system of the server cannot directly host an emulator instance, the server may instead have virtualized environments that support an operating system that can host the emulator.

The device controller 616 may also assign network addresses to each emulator using a proxy server 620. The proxy server 620 interfaces between each of the emulators and the Internet. As an example, the device controller 616 may select from a pool of available IP addresses. In some implementations, the device controller 616 may simply assign IP addresses to the emulators in a round-robin manner.

In other implementations, this pool of available IP addresses may be associated with different geolocation values. As a result, when the emulator contacts a service that infers geolocation from IP addresses, the emulator can appear to be located in that geographic region. In various implementations, the proxy server 620 allows geolocation for one or more apps to be established by an operator of the web crawler 120. In this way, the operator can control what geographical perspective of an app will be crawled.

A request rate manager 624 receives each request from the master controller 604 and applies a rate limit per app. For example, the server responsible for a given app may accept no more than a predetermined number of requests per hour or per day. Once this limit is exceeded, the request rate manager 624 may indicate that further requests for data from that app cannot be satisfied. If the request does not exceed the threshold, the request rate manager 624 provides the request to a specified one of the set of emulation servers 140.

An output buffer 628 receives data scraped from a state of an app running within the set of emulation servers 140. The output buffer 628 queues data from the set of emulation servers 140, which may be arriving asynchronously and in bursts. The output buffer 628 provides data for a state to an output formatter 632. The output formatter may create an XML representation of the state data and encapsulate that XML representation in an HTTP response. The output formatter 632 may receive parameters about the HTTP request from the master controller 604 so that the HTTP response can be matched up by the web crawler 120 with the original HTTP request.

Figure 7:
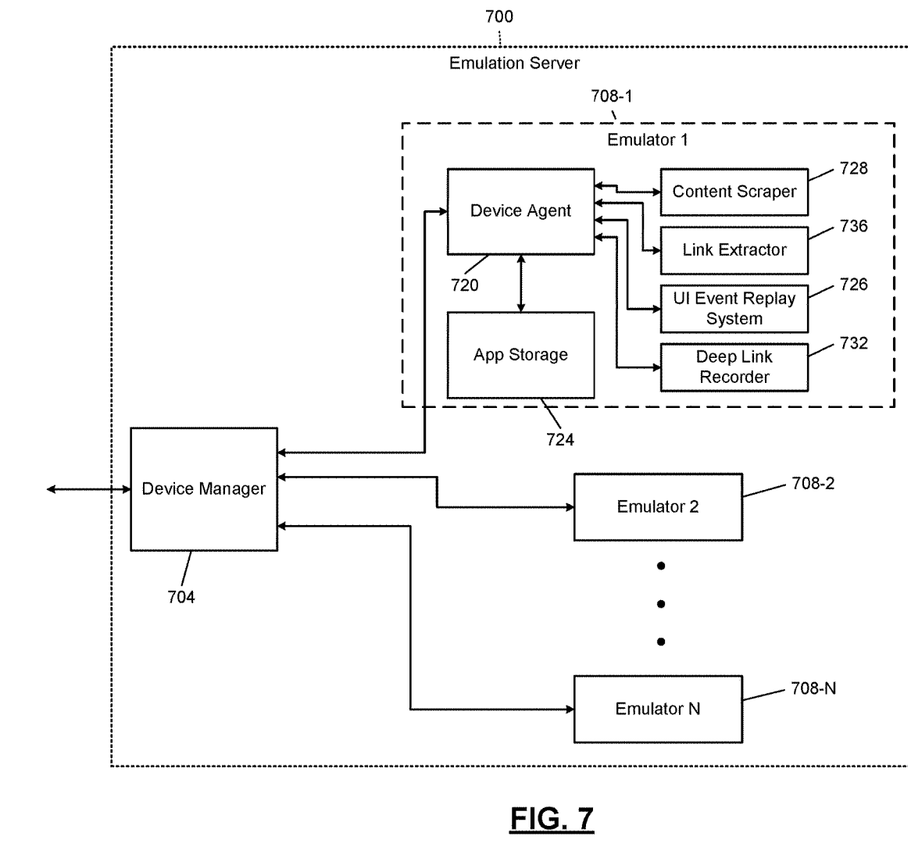
FIG. 7 is a functional block diagram of an example implementation of an emulation server.

In FIG. 7, an example implementation of an emulation server 700 (such as one of the set of emulation servers 140) includes a device manager 704 that interfaces between emulators 708-1, 708-2, ... 708-N (collectively, emulators 708) and the request rate manager 624 of FIG. 6.

Requests from the request rate manager 624 are provided to a specified one of the emulators 708. Results are returned to the output buffer 628 of the wrapper system 124 via the device manager 704. In response to the device controller 616 of FIG. 6, the device manager 704 provides instructions to the emulators 708 regarding which apps to install and to run.

In the emulator 708-1, a device agent 720 communicates with the device manager 704. The device agent 720 may be an installed app but with greater privileges than a regular app. For example, the device agent 720 may be installed as a launcher app in the emulator 708-1. In other implementations, the device agent 720 may be incorporated into an operating system, such as the ANDROID operating system, running on the emulator 708-1.

App storage 724 allows for storage of apps that may be executed in order to return results for a query. The apps stored in the app storage 724 may be pre-loaded when the emulator 708-1 is instantiated or may be added by request of the device manager 704. The app storage 724 may be standard storage for apps provided by the operating system or may be a separate repository.

The device agent 720 uses a user interface (UI) event replay system 726 to navigate to a specific state of an app from which information is to be extracted. The UI event replay system 726 may be described more generally as a navigation controller because, as described below, navigation to a specific state may rely on more than just replaying UI events.

A content scraper 728 extracts content from the specific state. For example, the content may include text, images, and metadata (which may include explicit metadata, such as image tags, or may be inferred from location or formatting of text or images). The content scraper 728 may extract a UI tree of elements from the state and encode that tree using XML (Extensible Markup Language). The content scraper 728 may also capture screenshots of a state. The content scraper also identifies which states are reachable from the present state.

The device agent 720 controls which apps are executing, which apps are installed, and which app is in the foreground. In various implementations, bringing an app to the foreground or installing an app may be performed using the UI event replay system 726. In other implementations, installing an app may be performed by providing an install instruction to a built-in app retrieval mechanism that accesses a digital distribution platform.

The device agent 720 may also be able to fire (that is, call) methods or APIs (also referred to as intents) that direct an app to transition to a particular state. When available, firing a method can be performed instead of navigating using simulated UI events from the UI event replay system 726. In other situations, such as where a method is not available to directly arrive at a certain state, a method may be fired to perform some of the navigation, followed by the UI event replay system 726 completing the navigation.

A deep link recorder 732 may be included to record paths to certain states for later replay to reach those states once again. A link extractor 736 may be used to identify other states of interest that should be crawled either by a crawling system or within the emulator 708-1. The emulator 708-2 and the rest of the emulators 708 may operate similarly to the emulator 708-1.

The UI event replay system 726 may use an accessibility framework or a scripting framework of an operating system executing on the emulation server 700. Similarly, the content scraper 728 may extract data from one of the emulators 708 using screenshot and UI enumeration capability built into the operating system for accessibility, scripting, or development purposes.

Figure 8:
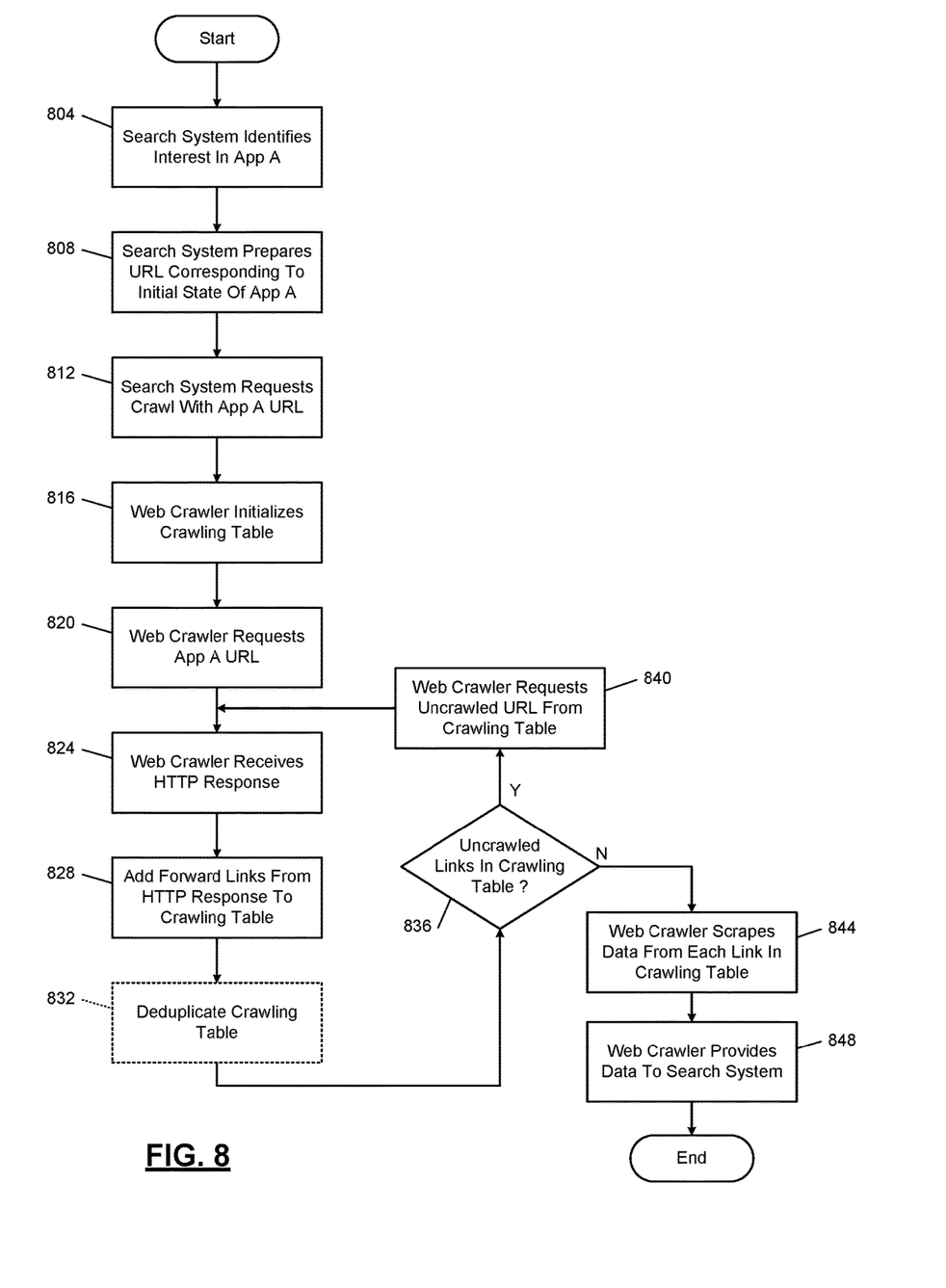
FIG. 8 is a flowchart of example data collection operation on behalf of the search system by the web crawler.

In FIG. 8, overall operation for app A begins at 804, where the search system identifies an interest in the contents of app A. At 808, the search system prepares a URL corresponding to initial state (which may be the home state or some other more specific state) of app A. For example, a more specific state may be selected when an app has a number of different functions. For example, an events app may include cultural events, sporting events, etc. and only one of these types of events may be of interest to the search system. As a result, the initial URL may point to a state that corresponds only to the information of interest to the search system.

At 812, control requests that a web crawler begins crawling starting at the prepared URL corresponding to app A. App A may be specified using a name or a unique identifier that will be recognizable by the wrapper system. At 816, the web crawler initializes a crawling table. The crawling table includes a set of links and an indication of whether those links have been visited. The initialized crawling table may be empty except for the URL received from the search system.

At 820, the web crawler requests the URL from the search system. This request, as described above, is intercepted by the wrapper system instead of going out to the World Wide Web. At 824, the web crawler receives an HTTP response as if a web server had responded to the HTTP request of 820. At 828, control adds forward links from the HTTP response to the crawling table. This identifies that these forward links will need to be crawled in the future before crawling can be declared complete.

At 832, control optionally de-duplicates the crawling table. In various implementations, this deduplication may be performed as the forward links are being added to the crawling table, with duplicative links (those pointing to a state that had already been added to a crawling table) being discarded or combined with the existing entry in the crawling table.

Control continues at 836, control determines whether uncrawled links remain in the crawling table. If so, control transfers 840; otherwise, control transfers to 844. At 840, the web crawler requests one of the uncrawled URLs from the crawling table and control continues at 824. At 844, the web crawler, or a separate scraping process scrapes data from each link in the crawling table. This scraping may also be performed using HTTP requests, which are intercepted by the wrapper system. In various implementations, the scraping may be performed as the web crawling progresses to avoid having to visit a link twice. At 848, the web crawler provides the accumulated data to the search system so the search system can then provide results based on the data of app A.

Figure 9:
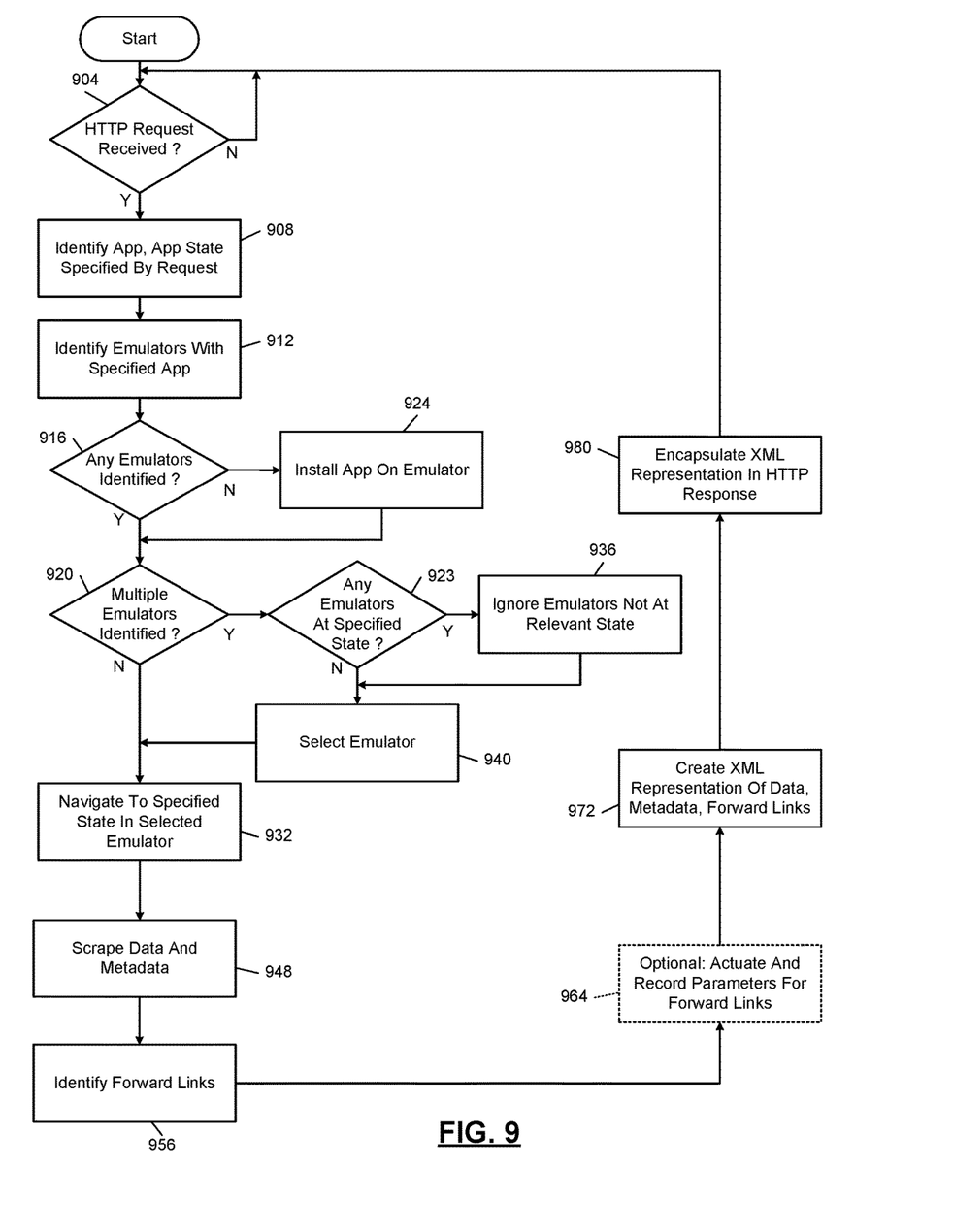
FIG. 9 is a flowchart of example operation of the wrapper system.

In FIG. 9, example operation of the wrapper system begins at 904. If an HTTP request is received, control transfers to 908; otherwise, control remains at 904. At 908, control identifies the app and the app state specified by the HTTP request. At 912, control identifies emulators in the set of emulation servers that have the specified app installed. At 916, if any emulators are identified, control continues at 920; otherwise, control transfers to 924.

At 924, control instructs at least one emulator to install the app. Usage data may be updated to indicate the frequency of an app's usage to determine whether the app should be installed on further emulators or uninstalled all together and only installed on the rare occasions when it's required. Control then continues at 920.

At 920, if multiple emulators have been identified with the app having been installed, control transfers to 923; otherwise, control transfers to 932. At 923, control determines whether any of the emulators with this app are already at the specified state. If so, control transfers to 936; otherwise, control transfers to 940. At 936, control ignores identified emulators that are not at the relevant state. Control then continues at 940. At 940, control selects one of the identified emulators. For example, the selection may be based on load on the emulation server, where the server with the lowest load is selected. Control continues at 932.

At 932, control navigates to the specified state in the selected emulator. At 948, control scrapes data and metadata from the specified state. At 956, control identifies forward links within the state. These forward links are user interface elements that allow another state to be reached from the specified state. Control continues at 964, where control optionally actuates some or all of the forward links and records parameters for directly accessing those states.

For example, when API calls are available to directly arrive at a state, the forward links of a state may be actuated to see which parameters are used to arrive at the subsequent states. These parameters may be identified and stored to allow direct access to those states. At 972, control creates a serialized representation of the data, metadata, and forward links. For example, this may be an XML data structure. At 980, control encapsulates the XML representation in an HTTP response to be sent to web crawler. Control then continues at 904.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. §112(f) unless an element is expressly recited using the phrase "means for" or, in the case of a method claim, using the phrases "operation for" or "step for."

What is claimed is:

1. A computer system comprising:
   a master controller configured to receive a first hypertext transfer protocol (HTTP) request for a first uniform resource locator (URL), wherein the URL indicates a first state of a first mobile application;
   a device controller configured to provision a device to execute the first mobile application;
   a navigation controller configured to navigate to the first state of the first mobile application within the device;
   a content scraper configured to extract content from the first state and identify forward links to corresponding additional states of the first mobile application, wherein each forward link is expressed as a path to navigate from the first state to the corresponding additional state; and an output formatter configured to package the content and the forward links into an HTTP response and transmit the HTTP response to a source of the first HTTP request, wherein the HTTP response includes a forward URL for each additional state of the first mobile application reachable from the first state, and wherein, for each additional state, the forward URL includes (i) an indicator of the first mobile application and (ii) a path to reach the additional state within the first mobile application.

2. The computer system of claim 1 wherein the device comprises one of:

an emulator configured to execute an operating system on emulated hardware, wherein the operating system is selected based on an operating system the first mobile application was compiled for; and a simulator configured to simulate interaction of the operating system with the first mobile application.

3. The computer system of claim 1 further comprising:

a web crawler configured to provide HTTP requests to the master controller based on forward URLs in prior HTTP responses;

a content store configured to create a new record for each HTTP response transmitted by the output formatter, wherein the new record stores the content from the HTTP response; and a deduplicator configured to, in response to a second HTTP response being transmitted by the output formatter:

compare content from the second HTTP response to records in the content store; and in response to identifying a record in the content store that matches the content from the second HTTP response, prevent the content store from creating the new record for the second HTTP response.

4. The computer system of claim 3 wherein:

the content store is configured to, in response to the content from the second HTTP response matching the identified record in the content store, adding a second URL to the identified record in the content store; and the second HTTP response was transmitted by the output formatter in response to the web crawler providing an HTTP request with the second URL to the master controller.

5. The computer system of claim 1 further comprising a request rate manager configured to:

monitor an aggregate rate of accesses to the first mobile application; and limit accesses to the first mobile application in response to a threshold being reached, wherein the threshold is based on at least one of contractual and technical restrictions imposed by an operator of a backend server system that supplies data to the first mobile application.

6. The computer system of claim 1 wherein the output formatter is configured to encode the content using extensible markup language (XML).

7. The computer system of claim 1 wherein the device controller is configured to provision the device to execute the first mobile application in response to the first HTTP request.

8. The computer system of claim 7 wherein the device controller is configured to provision additional devices to execute the first mobile application in response to receiving additional HTTP requests indicating the first mobile application.

9. The computer system of claim 1 wherein, for each additional state, the path of the forward URL includes a sequence of user interface (UI) events to perform to reach the additional state within the first mobile application.

10. The computer system of claim 1 further comprising a proxy server configured to assign an externally-visible internet protocol (IP) address to the device.

11. The computer system of claim 10 wherein:

the proxy server is configured to select the IP address so that IP geolocation will presume the device is present at a specified location; and the specified location is specified by an operator of a system transmitting the HTTP request.

12. A method of operating a computer system, the method comprising:

receiving a first hypertext transfer protocol (HTTP) request for a first uniform resource locator (URL), wherein the URL indicates a first state of a first mobile application;

provisioning a device to execute the first mobile application;

navigating to the first state of the first mobile application within the device;

extracting content from the first state and identifying forward links to corresponding additional states of the first mobile application, wherein each forward link is expressed as a path to navigate from the first state to the corresponding additional state; and packaging the content and the forward links into an HTTP response and transmitting the HTTP response to a source of the first HTTP request, wherein the HTTP response includes a forward URL for each additional state of the first mobile application reachable from the first state, and wherein, for each additional state, the forward URL includes (i) an indicator of the first mobile application and (ii) a path to reach the additional state within the first mobile application.

13. The method of claim 12 wherein the device comprises one of:

an emulator configured to execute an operating system on emulated hardware, wherein the operating system is selected based on an operating system the first mobile application was compiled for; and a simulator configured to simulate interaction of the operating system with the first mobile application.

14. The method of claim 12 further comprising:

providing HTTP requests based on forward URLs in prior HTTP responses;

creating a new record in a content store for each transmitted HTTP response, wherein the new record stores the content from the HTTP response; and in response to a second HTTP response being transmitted:

comparing content from the second HTTP response to records in the content store; and in response to identifying a record in the content store that matches the content from the second HTTP response, preventing the content store from creating the new record for the second HTTP response.

15. The method of claim 14 further comprising:

in response to the content from the second HTTP response matching the identified record in the content store, adding a second URL to the identified record in the content store, wherein the second HTTP response was transmitted in response to an HTTP request with the second URL.

16. The method of claim 12 further comprising:
monitoring an aggregate rate of accesses to the first mobile application; and
limiting accesses to the first mobile application in response to a threshold being reached,
wherein the threshold is based on at least one of contractual and technical restrictions imposed by an operator of a backend server system that supplies data to the first mobile application.

17. The method of claim 12 further comprising encoding the content using extensible markup language (XML).

18. The method of claim 12 further comprising:
provisioning the device to execute the first mobile application in response to the first HTTP request; and
provisioning additional devices to execute the first mobile application in response to receiving additional HTTP requests indicating the first mobile application.

19. The method of claim 12 wherein, for each additional state, the path of the forward URL includes a sequence of user interface (UI) events to perform to reach the additional state within the first mobile application.

20. The method of claim 12 further comprising:
assigning an externally-visible internet protocol (IP) address to the device so that IP geolocation will presume the device is present at a specified location,
wherein the specified location is specified by an operator of a system transmitting the HTTP request.

* * * * *